Jan. 7, 1958 A. G. LAUCK 2,818,684
GLASSWARE FORMING APPARATUS
Filed March 5, 1956 2 Sheets-Sheet 1
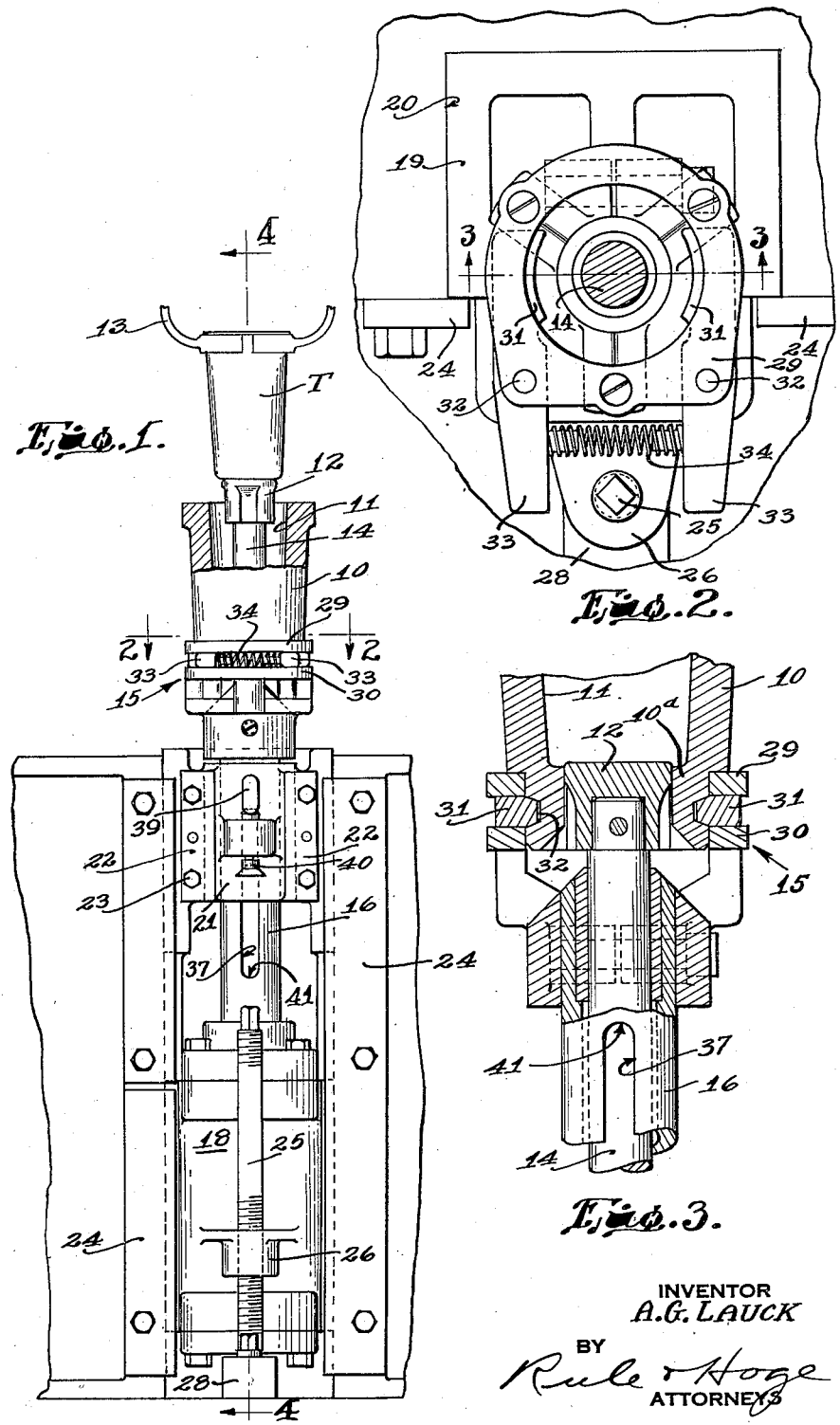
INVENTOR
A.G. LAUCK
BY
Rule & Hoge
ATTORNEYS

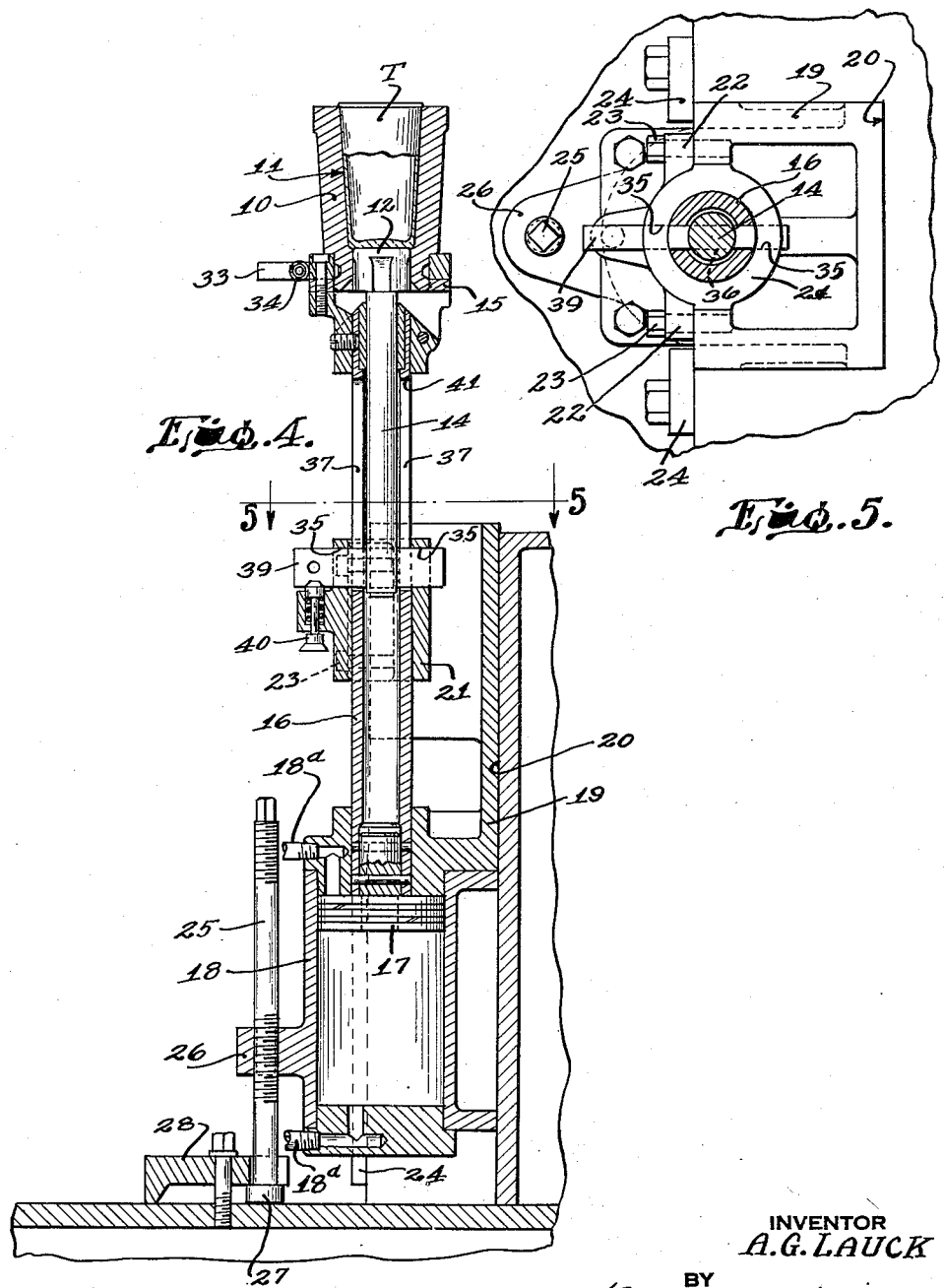

United States Patent Office 2,818,684
Patented Jan. 7, 1958

2,818,684

GLASSWARE FORMING APPARATUS

Albert G. Lauck, Toledo, Ohio, assignor to Owens-Illinois Glass Company, a corporation of Ohio Application March 5, 1956, Serial No. 569,623

5 Claims. (Cl. 49—69)

The present invention relates to glassware forming apparatus and more particularly to the blow mold unit of a conventional type of machine in which, for example, a measured charge of molten glass or a preformed blank or parison is given its final shape in the blow mold by any conventional or preferred means. In such machines, it is customary to deposit a mold charge of molten glass in the blow mold and by means of a press plunger transform such glass into a finished article insofar as the shape and wall thickness are concerned. Alternatively a partially formed article commonly referred to as a blank or parison may be positioned in such a blow mold and by conventional means given the desired final shape.

An object of my invention is the provision in such a machine of a novel form of blow mold unit in the operation of which the blow mold is of one-piece construction and may be stripped axially away from the finished article so that the latter is left resting upon a bottom plate in position to be readily grasped by take-out tongs or other such devices.

A further object of my invention is the provision in an apparatus of the above character of simple and effective means for maintaining the blow mold and bottom plate in the desired relationship at all times and, additionally, providing for simultaneous adjustment of the operating positions of these elements.

It is also an object of my invention to provide novel means facilitating removal and replacement of either or both the blow mold and bottom plate.

Other objects will be in part apparent and in part pointed out hereinafter.

In the drawings:

Fig. 1 is a fragmentary front elevational view with parts in section showing my invention.

Fig. 2 is a sectional elevational view taken substantially along the line 2—2 of Fig. 1 with the blow mold removed.

Fig. 3 is a transverse sectional view taken substantially along the line 3—3 of Fig. 2.

Fig. 4 is a vertical longitudinal sectional view with parts in elevation taken substantially along the line 4—4 of Fig. 1.

Fig. 5 is a sectional plan view taken along the line 5—5 of Fig. 4.

In view of the fact that the present invention is particularly directed to the blow mold or finishing mold unit of a glassware forming machine and is usable with various types of mold charging and/or blank forming mechanisms, many of which are disclosed in already issued patents, I have restricted my disclosure to an illustration of the important characteristics of the blow mold or finishing mold unit. As explained heretofore, either a measured charge of molten glass or a preformed blank may be placed in the blow mold 10 and therein formed to the shape of the finished article.

In the illustrated embodiment of my invention, the blow mold 10 or finishing mold is of one-piece construction to prevent the formation of the mold seams which are almost invariably present in glassware produced in multi-part molds. The mold cavity 11 is tapered inwardly and downwardly and is open at both ends. A bottom plate 12 is adapted to close the lower end of the mold at times and, as will be apparent presently, serves the two-fold purpose of giving proper form to the bottom of the article of glassware and later supporting the completed article during separation of same from the mold and until suitable transfer tongs 13 remove the article from its upright position upon the bottom plate. It will be observed, upon reference to Figs. 1 and 4, that separation of the finished article from the mold is obtained by moving the latter axially downward thereby stripping the mold from the article and telescoping said mold downwardly over both the bottom plate 12 and a vertical supporting rod 14 upon the upper end of which said bottom plate is mounted.

The blow mold is separably connected to a holder 15 which, in turn, is detachably mounted upon the upper end of a tubular support 16, the latter being telescoped over the aforementioned bottom plate supporting rod 14 and extending vertically downward to a point at which it is attached to a piston 17. This piston is positioned in an air cylinder 18 to thereby provide a piston motor designed to reciprocate the tubular support 16 vertically and correspondingly move the blow mold relative to the bottom plate. Air under pressure is supplied to the opposite ends of the motor cylinder 18 through conduits 18a. This piston motor is carried by a slide frame 19 which is mounted in a slide-way 20 and near its upper end carries a vertical guide 21 for the tubular support 16. This guide 21 (Figs. 1, 4 and 5) is provided with a pair of opposed vertical flanges 22 which are secured by screws 23 or the like fasteners to portions of the slide frame 19. The slide frame 19, incidentally, is secured in the slide-way 20 by means of retaining plates 24. This slide frame 19, with all of the elements supported thereby, may be adjusted vertically as a unit to insure proper positioning of the blow mold and bottom plate, such being effected by a device including a vertical threaded adjusting rod 25 which is threaded through a boss 26 on the motor cylinder 18 and at its lower end is formed with a head 27, the latter together with a clamp 28 serving to hold the rod against axial movement. Thus, with rotation of the rod 25, the slide frame and parts mounted thereon can be adjusted vertically with ease.

Reverting for a moment to the blow mold holder arrangement, it will be observed, by reference to Figs. 2, 3 and 4, that this holder is in the form of a ring-like frame including upper and lower elements 29 and 30, Fig. 3, spaced apart to permit entry therebetween of a pair of opposed jaws 31 which have their inner adjacent margins substantially dove-tailed in cross-section and adapted for reception in segments an annular groove 32 formed externally of the reduced lower end 10a of the blow mold 10. These jaws 31 are pivoted to vertical hinge pins 32 and include a pair of substantially parallel extensions 33 between which an expansion coil spring 34 is positioned for the purpose normally urging said jaws inwardly for firm engagement with the blow mold 10. Thus, it is apparent that merely by moving the extensions 33 toward each other in opposition to the spring pressure, the jaws 31 may be retracted to facilitate removal and replacement of blow molds.

Relative rotation of the blow mold and bottom plate very obviously would be undesirable and, additionally, it is necessary to effectively control the stroke of the reciprocating tubular support 16 for the blow mold 10 to the end that when the latter is in its uppermost position it will very accurately assume the proper position relative to the bottom plate 12 and, as a consequence, materially aid in the production of marketable ware. The structure by which the above is obtained may well be that shown in Figs. 1, 4 and 5. The guide 21 for the tubular support 16 is formed with a pair of diametrically opposed horizontal slots 35, these slots being in register with a transverse slot 36 in and near the lower end of the bottom plate supporting rod 14 and a pair of diametrically opposed slots 37 which are formed in the tubular support 16 and are of substantial extent as indicated in Figs. 1 and 4. A cross-bar 39 extends through the several aligned slots just mentioned and effectively secures the bottom plate supporting rod 14 against any vertical or rotative movement relative to the guide 21, or piston motor. A spring-pressed detent 40, Fig. 4, functions to releasably secure the cross-bar 39 in its operative position. The ends 41 of the slots 37 function as stops engageable with opposed margins of the cross-bar 39 whereby to effectively limit the stroke of reciprocation of the blow mold.

Briefly reviewing the operation of this apparatus, it will be assumed that the article of glassware, a tumbler T, for example, has been given its final shape in the blow mold 10. The piston motor is then operated to lower the piston 17 and with it the tubular support 16 and blow mold 10 carried thereby. This operation quickly and without disturbing the tumbler, separates the mold and tumbler and results in positioning of the blow mold well below the bottom plate 12 as shown in Fig. 1. At this stage of the operation, tongs 13 or other preferred article handling devices may very easily grasp the tumbler and transfer it to a conveyor (not shown) for delivery to an annealing lehr (not shown) or to any other desired point. Adjustment of the operating position of both the blow mold and bottom plate may be obtained by rotation of the adjusting rod 25 in an obvious manner as explained heretofore.

Modifications may be resorted to within the spirit and scope of the appended claims.

I claim:

1. In glassware forming apparatus, a one-piece blow mold having its axis disposed vertically and formed with a cavity, the walls of which taper downwardly and inwardly, said mold having open upper and lower ends, a bottom plate adapted at times to close the lower end of the mold and at all times positioned coaxially with the latter, means supporting the bottom plate at a fixed elevation comprising a rod axially aligned with and depending from the bottom plate, means for reciprocating the blow mold axially relative to the bottom plate whereby to position the latter at times at an elevation above the upper end of the blow mold for the removal of a finished article of glassware resting upon said bottom plate, the blow mold reciprocating means comprising a tubular support telescoped over the bottom plate supporting rod and a piston motor operable to reciprocate the tubular support.

2. In glassware forming apparatus, a one-piece blow mold having its axis disposed vertically and formed with a cavity, the walls of which taper downwardly and inwardly, said mold having open upper and lower ends, a bottom plate adapted at times to close the lower end of the mold and at all times positioned coaxially with the latter, means supporting the bottom plate at a fixed elevation comprising a rod axially aligned with and depending from the bottom plate, means for reciprocating the blow mold axially relative to the bottom plate whereby to position the latter at times at an elevation above the upper end of the blow mold for the removal of a finished article of glassware resting upon said bottom plate, the blow mold reciprocating means comprising a tubular support telescoped over the bottom plate carrying rod, a separable connector for attaching the mold to the upper end of the tubular support, a piston motor operatively connected to the lower end of the tubular support for reciprocating the latter and means for adjusting the operating positions of the mold and bottom plate.

3. In glassware forming apparatus, a one-piece blow mold having its axis disposed vertically and formed with a cavity, the walls of which taper downwardly and inwardly, said mold having open upper and lower ends, a bottom plate adapted at times to close the lower end of the mold and at all times positioned coaxially with the latter, means supporting the bottom plate at a fixed elevation comprising a rod axially aligned with and depending from the bottom plate means for reciprocating the blow mold axially relative to the bottom plate whereby to position the latter at times at an elevation above the upper end of the blow mold for the removal of a finished article of glassware resting upon said bottom plate, the blow mold reciprocating means comprising a tubular support telescoped over the bottom plate carrying rod, a separable connector for attaching the mold to the upper end of the tubular support, a piston motor operatively connected to the lower end of the tubular support for reciprocating the latter, means for adjusting the operating positions of the mold and bottom plate, the bottom plate and blow mold adjusting means comprising a vertically movable slide frame carrying said motor and the supports for the bottom plate and blow mold and means for adjusting the position of the slide frame vertically.

4. In glassware forming apparatus, a one-piece blow mold having its axis disposed vertically and formed with a cavity, the walls of which taper downwardly and inwardly, said mold having open upper and lower ends, a bottom plate adapted at times to close the lower end of the mold and at all times positioned coaxially with the latter, means supporting the bottom plate at a fixed elevation comprising a rod axially aligned with and depending from the bottom plate, a tubular support for the blow mold telescoped over the bottom plate supporting rod, a piston motor connected to the lower end of the tubular support for reciprocating the latter and correspondingly moving the blow mold relative to the bottom plate, a vertically movable slide frame upon which the motor and the supports for the bottom plate and blow mold are mounted, a vertical guide for the aforesaid tubular support carried by said slide frame, said bottom plate supporting rod having a transverse opening near its lower end, said tubular support having diametrically opposed slots extending longitudinally thereof and adapted to be positioned in register with the transverse opening in said rod and a cross-bar carried by said tubular guide and extending through said opening and aligned slots whereby to secure the bottom plate supporting rod against axial movement and to limit axial movement of the tubular support.

5. The combination defined in claim 4 and a spring-pressed detent releasably holding the cross-bar in operative position.

References Cited in the file of this patent

UNITED STATES PATENTS

| | | |
|---|---|---|
| 1,399,325 | Straub | Dec. 6, 1921 |
| 1,844,987 | Slick | Feb. 16, 1932 |